US010210018B2

(12) United States Patent
Shpeisman et al.

(10) Patent No.: US 10,210,018 B2
(45) Date of Patent: Feb. 19, 2019

(54) OPTIMIZING QUIESCENCE IN A SOFTWARE TRANSACTIONAL MEMORY (STM) SYSTEM

(75) Inventors: Tatiana Shpeisman, Menlo Park, CA (US); Ali-Reza Adl-Tabatabai, San Jose, CA (US); Vijay Menon, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 1354 days.

(21) Appl. No.: 12/344,144

(22) Filed: Dec. 24, 2008

(65) Prior Publication Data
US 2010/0162249 A1   Jun. 24, 2010

(51) Int. Cl.
    *G06F 9/46* (2006.01)
(52) U.S. Cl.
    CPC .................................. *G06F 9/466* (2013.01)
(58) Field of Classification Search
    None
    See application file for complete search history.

(56) References Cited

U.S. PATENT DOCUMENTS

| 2004/0044739 A1* | 3/2004  | Ziegler ........................ 709/213 |
| 2008/0256073 A1* | 10/2008 | Detlefs et al. .................... 707/8 |
| 2008/0256074 A1* | 10/2008 | Lev et al. ........................ 707/8 |

OTHER PUBLICATIONS

Ramadan et al., "Dependence-aware transactional memory for increased concurrency"; Micro-41; The 41st Annual IEEE/ACM International Symposium on Microarchitecture; Como, Italy; dated Nov. 8-12, 2008.*
Kumar et al., "Hybrid Transactional Memory", PPoPP'06 Mar. 29-31, 2006, New York, New York, USA, pp. 209-220.*
Menon et al., "Towards a Lock-based Semantics for Java STM", Nov. 1, 2007, University of Washington Technical Report, pp. 1-13.*

* cited by examiner

*Primary Examiner* — John M Lindlof
(74) *Attorney, Agent, or Firm* — Barnes & Thornburg LLP

(57) ABSTRACT

A method and apparatus for optimizing quiescence in a transactional memory system is herein described. Non-ordering transactions, such as read-only transactions, transactions that do not access non-transactional data, and write-buffering hardware transactions, are identified. Quiescence in weak atomicity software transactional memory (STM) systems is optimized through selective application of quiescence. As a result, transactions may be decoupled from dependency on quiescing/waiting on previous non-ordering transaction to increase parallelization and reduce inefficiency based on serialization of transactions.

28 Claims, 4 Drawing Sheets

OPTIMIZING QUIESCENCE IN A SOFTWARE TRANSACTIONAL MEMORY (STM) SYSTEM

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. Either way, after extrapolating this simple example into a large scalable program, it is apparent that the complexity of lock contention, serialization, fine-grain synchronization, and deadlock avoidance become extremely cumbersome burdens for programmers.

Another recent data synchronization technique includes the use of transactional memory (TM). Often transactional execution includes executing a grouping of a plurality of micro-operations, operations, or instructions. In the example above, both threads execute within the hash table, and their memory accesses are monitored/tracked. If both threads access/alter the same entry, conflict resolution may be performed to ensure data validity. One type of transactional execution includes a Software Transactional Memory (STM), where tracking of memory accesses, conflict resolution, abort tasks, and other transactional tasks are performed in software.

In strongly atomic transactional memory systems, to ensure runtime conflicts between transactional memory operations and non-transactional memory operations do not occur, compilers treat each non-transactional memory operation as a single operation transaction. In other words, transactional barriers are inserted at non-transactional memory accesses to isolate transactions from these non-transactional memory accesses. Here, the potential incorrect execution due to conflicts between transactional and non-transactional accesses is avoided; yet, execution of transactional barriers at every non-transactional memory operation potentially wastes execution cycles.

In contrast, in weakly atomic transactional memory systems, only transactional accesses are isolated from each other. In such systems non-transactional memory accesses are not tracked and, thus, do not incur any additional transactional overhead. However, weakly atomic systems do not provide general isolation and ordering guarantees for programs that mix transactional and non-transactional accesses to the same data which may potentially lead, in some cases, to incorrect execution. As an example, pseudo code A is included below to illustrate potential problems created without isolation between accesses.

Pseudo Code A: Privatization example.

```
Initially: item != NULL, item->data = 0
Thread 1              Thread 2
atomic {              atomic {
    p = item;              if (item != NULL)
    item = NULL;               item->data = 1;
}                     }
r1 = p->data; // R1
r2 = p->data; // R2
         Can r1 != r2?
```

In an in-place-update STM, Thread 2 potentially reads item and sets data to 1 before Thread 1 sets item to NULL. Yet, this conflict may be detected and aborted after read R1. As a result, read R1 can see a dirty value of data (r1==1), while read R2 sees the correct value (r2==0) after transaction in Thread 2 aborts. Similarly, in a write-buffering STM, the transaction in Thread 2 might validate before the write to item in Thread 1 but copy the data from a write buffer into main memory after Thread 1 executes read R1. As a result, only read R2 would see the new value (r1==0 and r2==1).

Other examples of unsafe behaviors include overwriting a private write with a transactional write and inconsistent transactional execution due to interference from a private write. Usually, weakly atomic systems are augmented with additional mechanisms that enforce proper ordering between transactions and non-transactional memory accesses to ensure these unsafe behaviors do not occur. However, these mechanisms are often not efficiently applied, which potentially creates extra execution overhead.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware/software support for transactional execution, specific shared memory access tracking, specific locking/versioning/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific and alternative multi-core and multi-threaded processor architectures, transaction hardware, cache organizations, specific compiler methods/implementations, and specific operational details of microprocessors, have not been described in detail in order to avoid unnecessarily obscuring the present invention.

The method and apparatus described herein are for optimizing quiescence in transactional memory systems. Specifically, optimizing quiescence is primarily discussed in reference to an illustrative optimistic concurrency control Software Transactional Memory system (STM). In fact, specific reference is made to a version of optimizing privatization safety for an optimistic concurrency control write-buffering STM, such as in reference to FIG. 4 below. However, the methods and apparatus for optimizing safety mechanisms for transactional memory systems are not so limited, as they may be implemented in any transactional memory system, such as an update-in-place STM within a managed or native execution environment, as well as in conjunction with a hybrid transactional memory system, i.e. hardware and software transactional memory system.

Figure 1:
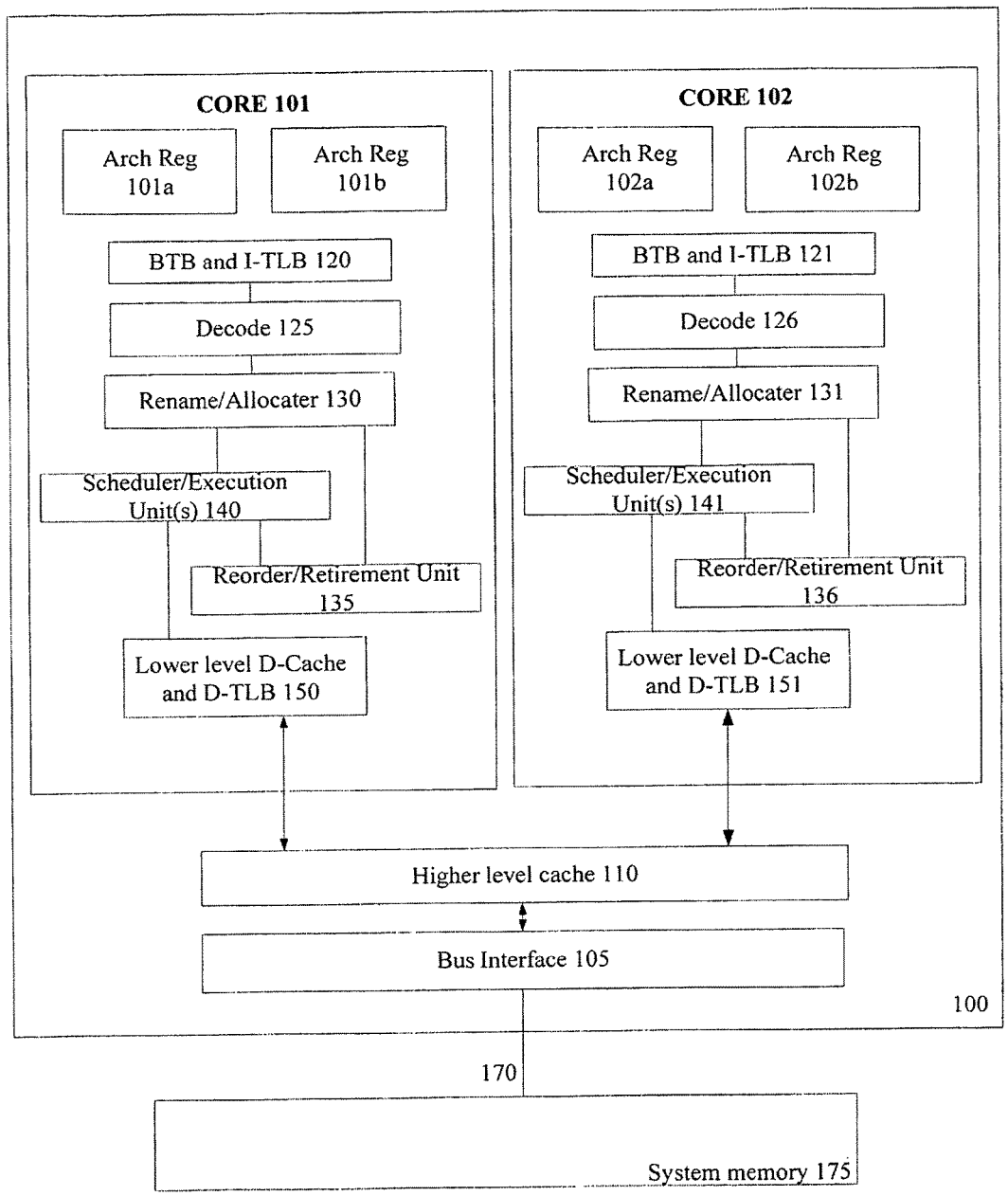
FIG. 1 illustrates an embodiment of a processor including multiple processing elements capable of executing multiple software threads.

Referring to FIG. 1, an embodiment of a processor capable of executing multiple threads concurrently is illustrated. Note, processor 100 may include hardware support for hardware transactional execution, hardware acceleration of an Software Transactional Memory (STM), execution of a STM, or a combination thereof, such as a hybrid Transactional Memory (TM) system. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102, which share access to higher level cache 110. Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four processors capable of executing four software threads.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of exemplary functional units/resources of a processor is illustrated. Note that a processor may include, or omit, any of these functional units, as well as include any known functional units, logic, or firmware not depicted.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further-out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e. a type of instruction cache, may instead be coupled after decoder 125 to store recently decoded traces. Module 120 also potentially includes a branch target buffer to predict branches to be executed/taken and an instruction-translation buffer (T-TLB) to store address translation entries for instructions.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages. Note the units and architecture of processor 100 are purely illustrative, as the methods and apparatus described herein may be implemented utilizing any hardware for execution.

In one embodiment, processor 100 is capable of transactional execution. A transaction, which may also be referred to as a critical or atomic section of code, includes a grouping of instructions, operations, or micro-operations to be executed as a group. For example, instructions or operations may be used to demarcate a transaction or a critical section. Typically, during execution of a transaction, updates to memory are not made globally visible to other transactions until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendency of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination or hybrid thereof.

A Hardware Transactional Memory (HTM) system often refers to tracking access during execution of a transaction in hardware of processor 100. For example, cache 150 is to cache a data item/object from system memory 175 for use by processing elements 101*a* and 101*b*. During execution of a transaction, an annotation/attribute field is associated with a cache line in cache 150, which is to hold the data object. The annotation field is utilized to track accesses to and from the cache line. Note that other caches, such as cache 110 may also be utilized for transactional memory. As a first example, cache 110 may include annotation bits. As another example, cache 110 may be utilized to hold "logged" write values in an update-in-place transactional memory system.

In one embodiment, if a write to a cache line that has previously tracked a load during a transaction occurs, then a data conflict is detected utilizing the cache line annotations. Similar to the discussion below in reference to STMs, an HTM may utilize write-buffering, i.e. buffering of writes until commit when the writes are copied to memory locations, or update-in-place, i.e. writes are performed to memory locations and not made globally visible until commit.

A Software Transactional Memory (STM) system often refers to performing access tracking, conflict resolution, or other transactional memory tasks in or at least partially in software. In one embodiment, processor 100 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

In one embodiment, a compiler dynamically compiles code in a runtime environment, such as a Just In Time (JIT) compiler in Java™ from Sun Corporation. Often, this type of compilation is referred to as dynamic compilation, i.e. compilation during runtime. In addition, Java™ from Sun Corporation is typically referred to as managed code, i.e. an abstraction level between physical hardware and software code often referred to as a virtual machine capable of running on multiple different physical/native machines. However, dynamic compilation may also refer to partial program analysis/compilation, i.e. where the compiler does not have the entire section of code available to perform analysis during compilation. In contrast, whole program analysis or pre-compilation before runtime execution is typically referred to as static compilation. In addition to a managed environment, a compiler may also compile program code to run in a native environment, such as compilation into x86 code to be executed on Intel architecture processors.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

To illustrate, assume a compiler, during compilation of main code, inserts memory access barrier function calls at transactional memory access operations, such as read barriers at transactional loads and write barriers at transactional stores, within program code. In addition, other calls and operations are also inserted in the main program code, such as commit calls and abort calls. In conjunction with the main program code, a library, such as a transactional runtime library, is also provided. Here, the transactional runtime library includes the read barrier, write barrier, commit, and abort functions, as well as other transactional memory related functions, such as validation functions, etc. One potential advantage of this distribution process includes the ability to update the barrier functions, commit functions, and abort functions through redistribution of a new library instead of recompilation of all the main application code.

Therefore, processor 100 executing "program code," in this example, to perform transactional memory related operations potentially includes processor 100 executing a compiler to insert/transform/compile main application code, a compiler or other code/operations to maintain transactional structures, execution of the compiled main application code, and execution of functions in a transactional runtime library. In another example, execution of program code includes execution of program code, such as a JIT compiler, to maintain transactional structures, such as read and write sets. Yet, as stated above, reference to execution of program code may include any known code for performance of the methods described herein.

Previously, quiescence was applied to every transaction in a weakly atomic Software Transactional Memory (STM) System. As an example, in an-update-in-place STM, quiescence delays commit of transaction A till any transaction B that started before A has validated, and in case validation failed, aborted. In a write-buffering STM, quiescence delays commit of transaction A till any transaction B that validated before A has committed. Quiescence is typically implemented by maintaining a global list of time stamps that indicate the last time each transaction performed the required action. A transaction then waits in a quiescent state until it is able to determine it is allowed to commit by comparing its timestamp with the other timestamps in the global list.

In one embodiment, processor 100 executes code to optimize quiescence in a transactional memory system. As an example, quiescence is selectively applied to transactions to ensure proper ordering and data validity, and as a result, potentially reduces both the number of transactions utilizing quiescence and the amount of time other transaction are in a quiescent state. In one embodiment, non-ordering transactions are identified, and quiescence is selectively applied in their presence. Examples of non-ordering transactions, which are discussed in more detail below, include read-only transactions, transactions that do not conflictingly access non-transactional data, and write-buffering hardware transactions.

As an example, quiescence of a current transaction is applied utilizing a global timestamp list. Here, a previous transaction that is ordering, i.e. not identified as non-ordering, is added to the global list in response to a specified action/quiescence add event, such as a transaction starting, a commit process starting, a validation starting, or other known transaction related event. Additionally, upon an attempted commit of the current transaction, the current transaction waits in a quiescent state until it is allowed to commit, which is determined by comparing its timestamp to those held in the global list. Here, if the previous transaction is ordering and added to the list, then the current transaction quiesces/waits upon the previous transaction.

In one embodiment, non-ordering transactions are not added to the global list, which potentially results in a number of optimizations. First, a quiescing transaction, such as the current transaction above, does not have to wait for a non-ordering transaction to become stable. Continuing the example above, the current transaction in a quiescent state does not wait on a previous non-ordering transaction, as the non-ordering transaction did not add its timestamp to the global list. Second, reading a value of a non-ordering transactions entry in the list is efficient and unlikely to incur a cache miss, since that entry is not modified, i.e. not added to the global list.

Figure 2:
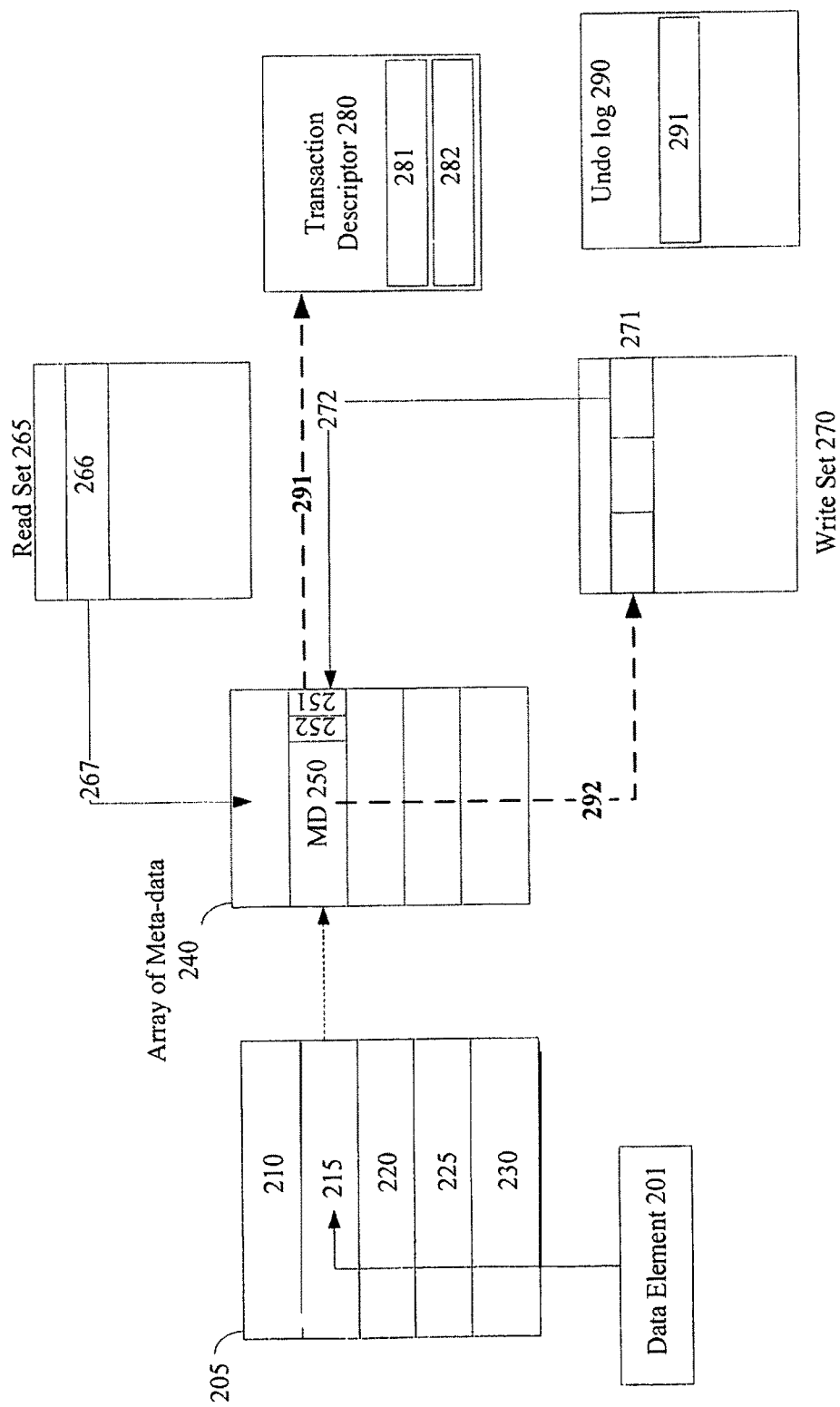
FIG. 2 illustrates an embodiment of structures to support transactional execution.

Referring to FIG. 2, a simplified illustrative embodiment of an optimistic STM system is depicted. In one embodiment of an STM, transactional barriers, such as read and write barriers, are utilized to ensure data consistency during transactional memory access operations. In other words, transactional barriers perform bookkeeping to ensure isolation and data validity between transactional accesses. In a strongly atomic system these transactional barriers are also inserted at non-transactional operations to ensure isolation and data validity between transactional and non-transactional accesses. In contrast, in a weakly atomic system a privatization safety mechanism, such as quiescence, is utilized to ensure proper ordering and data consistency between non-transactional and transactional memory accesses. This safety mechanism and transactional barriers may maintain and utilize transactional structures, such as those illustrated in FIG. 2.

In one embodiment of an STM, memory locations and/or data elements, such as data element 201 to be held in cache line 215, are associated with meta-data locations, such as meta-data location 250 in array 240. As an illustrative example, an address, or a portion thereof, associated with data element 201 and/or line 215 of cache memory 205 is hashed to index location 250 in array 240. Often, in regards to transactional memory, meta-data location 250 is referred to as a transaction record, while array 240 is referred to as an array of transaction records. Although transaction record 250, as illustrated, is associated with a single cache line, a transaction record may be provided at any data granularity level, such as a size of data element 201, which may be smaller or larger than cache line 215, as well as include an operand, an object, a class, a type, a field, a referenced data element, a data structure, a variable, or any other element of data.

In another embodiment, which is not depicted, alternative methods for mapping meta-data to data elements or objects are utilized. For example, data element 201 potentially includes a data object with any number of object fields.

Here, meta-data, such as location 250, is held in a field of the object or a header of the object. As an example, meta-data held in a header of an object is utilized as meta-data for all the object fields within the object. Therefore, although the description of FIG. 2 primarily focuses on cache line conflict detection, the methods and apparatus described herein may be utilized in any transactional memory system, such as in an object based conflict detection system.

Often in a STM, transaction record (TR) 250 is utilized to provide different levels of ownership of and access to an associated memory address and/or data element, such as data element 201. In one embodiment, TR 250 holds a first value to represent an unlocked or un-owned state and holds a second value to represent a locked or owned state. In some implementations, TR 250 may be capable of multiple different levels of locked or owned states, such as a write lock/exclusive lock state to provide exclusive ownership to a single owner, a read lock where reader(s) read data element 201 while allowing others to still read but not write data element 201, and a read lock with intent to upgrade to a write/exclusive lock state where a potential writer wants to acquire an exclusive write-lock but is waiting for current readers to release data element 201.

The values utilized to represent unlocked states and locked states in TR 250 vary based on the implementation. In one embodiment of a pessimistic concurrency control STM, TR 250 holds a bit vector, where higher order bits represent executing transactions, while LSB 251 and $2^{nd}$ LSB 252 represent a write lock state, an unlocked state, and a read with intent to upgrade to write lock state. In an unlocked state, the higher bits that are set to represent corresponding transactions that have read data element 201, i.e. corresponding transactions that have a shared read lock of transaction record 250. In a locked state, one of the higher bits are set to indicate which of the transactions has write locked data element 201. Here, bit 251 is utilized as an ownership indicator as discussed below.

In contrast, in one embodiment of an optimistic concurrency control STM, TR 250 holds a version or timestamp value to indicate an unlocked state and holds a reference, such as a pointer, to a transaction descriptor, such as transaction descriptor 280, to represent a locked state. Usually, transaction descriptor 280 holds information describing a transaction, such as transaction ID 281 and transaction state 282. The above described example of utilizing a pointer to transaction descriptor 280 is often referred to as a direct reference STM, where transaction record 250 holds a direct reference to owning transaction 281.

In another embodiment, an owned or locked value includes a reference to a write set entry, such as write entry 271 of write set 270. As an example, write entry 271 is to hold a logged version number from transaction record 250 before the lock is acquired, a pointer to transaction descriptor 280 to indicate that transaction 281 is associated with write entry 271, and a back pointer to transaction record 250. This example is often referred to as an indirect reference STM, where TR 250 references an owning transaction indirectly, i.e. through write entry 271.

In one embodiment, an access barrier is executed at a transactional memory access to data element 201 to ensure proper access and data validity. Here, an ownership test is often performed to determine the ownership state of TR 250. In one embodiment, a portion of TR 250, such as LSB 251 and/or $2^{nd}$ LSB 252, is utilized to indicate availability of data element 201. To illustrate, when LSB 251 holds a first value, such as a logical zero, then TR 250 is unlocked, and when LSB 251 holds a second value, such as a logical one, then TR 250 is locked. A test and modify instruction, such as a compare and exchange instruction, may be utilized to test the value of ownership bits. Here, when the compare is successful, i.e. TR 250 is unlocked, the exchange may modify TR 250 to a locked value, as described above. In addition, second LSB 252 may be utilized to indicate when a read owner intends to upgrade to an exclusive write lock, as discussed above with regard to a pessimistic concurrency control STM. Alternatively, the combination of bits 251-252, as well as other bits, may be utilized to encode different ownership states, such as the multiple lock states described above.

In one embodiment, barriers at transactional memory accesses perform bookkeeping in conjunction with the ownership tests described above. For example, upon a transactional read of data element 201, an ownership test is performed on TR 250. If unlocked, i.e. holding a version value in an optimistic concurrency control STM, the version value is logged in read entry 266 of read set 265. Later, upon validation, which may be on-demand during pendency of the transaction or at commit of the transaction, a current value of TR 250 is compared to the logged value in entry 266. If the values are different, then either another owner has locked TR 250 and/or modified data element 201, which results in a potential data conflict. Additionally, a write barrier may perform similar bookkeeping operations for a transactional write to data element 201, such as performing an ownership test, acquiring a lock, indicating an intent to upgrade the lock, managing write set 270, etc.

Usually, at the end of a transaction, a commit of the transaction is attempted. As an example, a read set is validated to ensure locations read from during pendency of the transaction are valid. In other words, a logged version value held in read entry 266 is compared against a current value held in transaction record 250. If the current value is the same as the logged version, then no other access has updated data element 201. Consequently, the read associated with entry 266 is determined to be valid. If all the memory accesses are determined to be valid, then the transaction is committed. Note as described below, during commit an optimized quiescent state may be employed before the transaction is actually committed.

However, if the versions are different and the current transaction did not read and then write to the data element, then another transaction either acquired a lock of TR 250 and/or modified data element 201. As a result, the transaction may then be aborted. Once again, depending on the implementation of the STM, the operations performed by the commit and abort functions may be interchangeable. For example, in a write-buffering STM, writes during a pendency of the transaction are buffered, and upon commit they are copied into the corresponding memory locations. Here, when the transaction is aborted, new values in the write-buffer are discarded. Inversely, in an update-in-place STM, the new values are held in the corresponding memory locations, while the old values are logged in a write log. Here, upon abort, the old values are copied back to the memory locations, and on a commit, the old values in the write log are discarded.

In an update-in-place STM, when roll-back of updated memory locations is needed, often an undo log, such as undo log 290 is utilized. As an example, undo log 290 includes entries, such as entry 291, to track updates to memory during a transaction. To illustrate, in an update-in-place STM, memory locations are updated directly. However, upon an abort, the updates are discarded based on undo log 290. In one embodiment, undo log 290 is capable of rolling back nested transactions. Here, undo log 290 potentially rolls back a nested transaction without invalidating higher/outer level transactions, such as rolling back to a checkpoint immediately before the start of the nested transaction.

As stated above, in a weakly atomic system, transactional barriers in conjunction with abort, commit, and other transactional functions provide isolation between transactional accesses, while other safety mechanisms are to ensure validity of shared data accessed inside and outside of a transaction, i.e. non-transactional data. As an example, some weakly atomic systems utilize a form of global synchronization called quiescence. Quiescence enforces ordering between transactional and non-transactional accesses by delaying transaction commit until preceding transactions are stable. Previously, quiescence was performed at every transaction commit, i.e. each transaction must wait for other previous concurrent transactions, which potentially hurts scalability of an STM system.

As a consequence, in one embodiment, weakly atomic safety mechanisms are optimized to be selectively performed. As a specific illustrative example, a transaction is determined to be a non-ordering or an ordering transaction. In one embodiment, a non-ordering transaction refers to a transaction that does not perform actions, which are observable or affected by subsequent private non-transactional memory accesses in another thread. The term non-ordering is utilized to illustrate that these transactions often do not require explicit sequential ordering with respect to non-transactional actions that occur after the transactions. Therefore, when a transaction is executing or attempting to commit, in one embodiment, it is determined whether weakly atomic safety mechanisms, such as quiescence, are to be performed based on whether a transaction is ordering or non-ordering.

To illustrate, assume a hybrid transactional memory system is utilized, where transactions may be executed utilizing a write-buffering HTM and/or an optimistic weak atomicity STM. A first transaction is executed in hardware utilizing the HTM, while a second transaction is executed in software utilizing the optimistic weak atomicity STM. Here, since the hardware writes are buffered and is capable of detecting invalidating concurrent writes, the first transaction may be deemed non-ordering. Upon commit of the second transaction, the second transaction does not wait on the first transaction to finish validation, even though it is an ordering transaction, since the non-ordering first transaction is not added or globally observed through quiescence. Consequently, the ordering transaction, i.e. the second transaction, does not have to wait on the first transaction, which potentially results in more efficient transaction execution that does not wholly rely on serialization.

Figure 3:
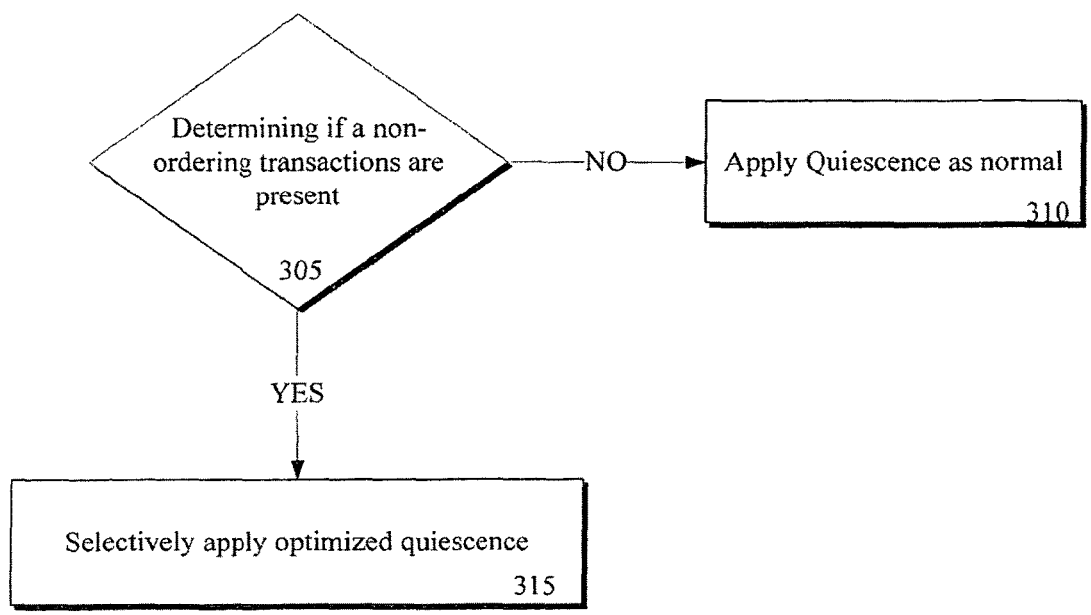
FIG. 3 illustrates an embodiment of a flowchart for a method of optimizing quiescence in weakly atomic transactional systems.
Figure 4:
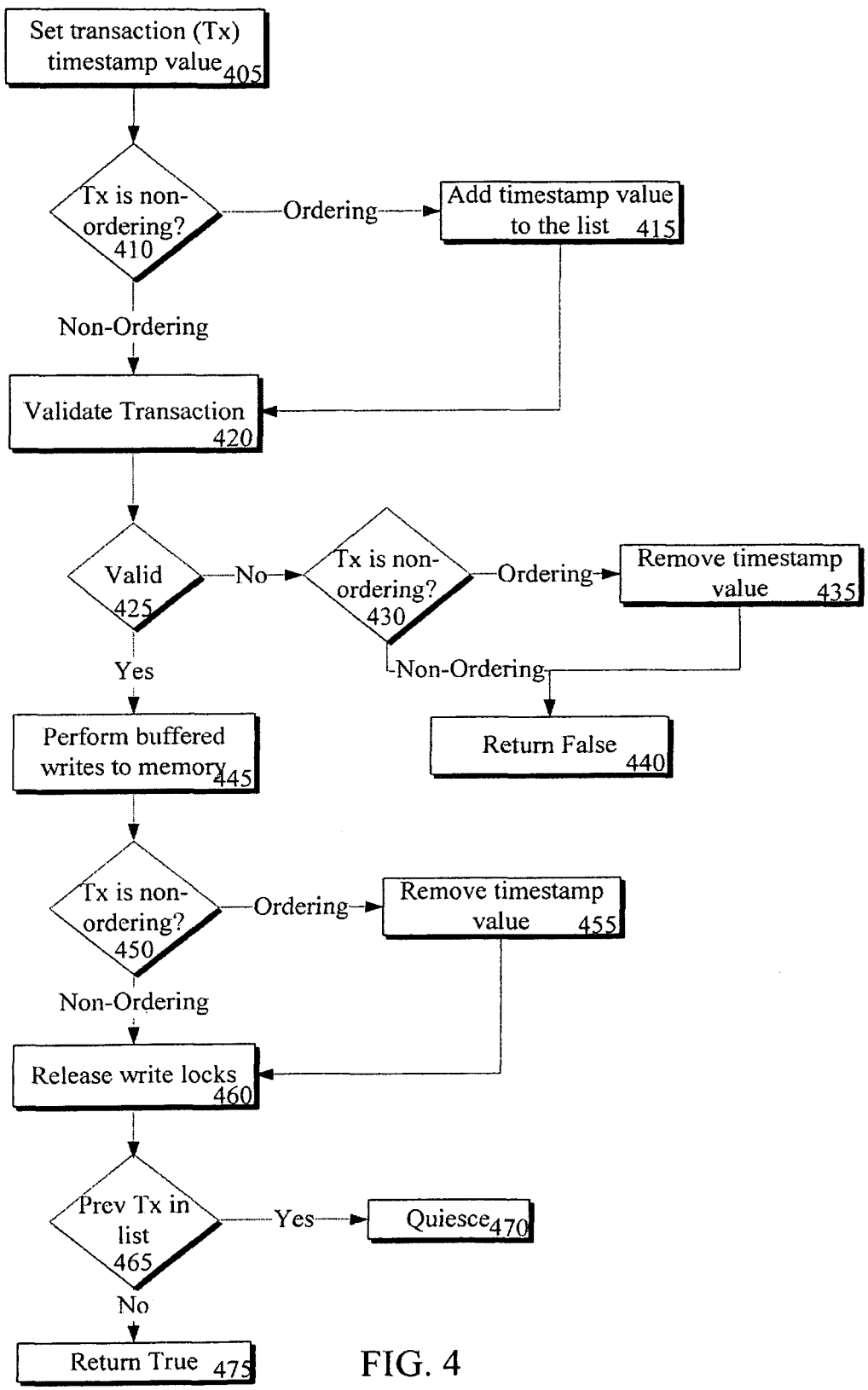
FIG. 4 illustrates another embodiment of a flowchart for a method of optimizing quiescence in weakly atomic transactional systems.

Referring next to FIG. 3, an embodiment of a flowchart for a method of providing optimized quiescence in transactional systems is illustrated. Note the flowcharts of FIGS. 3-4 are illustrated in a substantially serial fashion. However, the methods illustrated by these Figures are not so limited, as they may occur in any order, as well as being performed at least partially in parallel.

In flow 305, it is determined if non-ordering transactions are present. As an example, it is determined whether current transactions are non-ordering. After this analysis is done within each transaction, a global data structure, such as a list, is updated based on the analysis. For example, the data structure holds entries that correspond to current transactions. In one embodiment, if a transaction is determined to be ordering, an added value, such as a timestamp value, is updated in the corresponding entry. In contrast, if the transaction is determined to be non-ordering, then the entry is not modified. In one embodiment, not modifying the entry, leaves the entry in a removed state, i.e. holding a removed value, such as a logical zero. Therefore, after encountering multiple concurrent transactions, the global list may hold a plurality of entries, each holding a timestamp value or a removed value. A timestamp value indicates corresponding ordering transactions, while a removed value indicates corresponding non-ordering transactions or corresponding ordering transactions that have already been removed.

As stated above, the analysis associated with determining if a transaction is non-ordering may be performed statically during whole program analysis/compilation, as well as dynamically during runtime compilation/execution. A non-exhaustive list of exemplary non-ordering transactions includes read-only transactions in some execution environments, transactions that do not conflictingly access non-transactional data, and write-buffering hardware transactions.

In one embodiment, a read only transaction executing in a dynamic managed write buffering STM, such as a transaction in Java™ from Sun Microsystems Inc., is determined to be a non-ordering transaction. Often in this environment, inconsistency from private writes may be tolerated due to the inherent properties of the environment. Any known method of determining a transaction is read only may be utilized; however, for purpose of illustration, a few examples are discussed below.

As a first example, determining a transaction is non-ordering based on a read only nature/type of the transaction is done during compilation. Here, the compiler may determine if there are any disqualifying transactional writes within the transaction. If there are no disqualifying transactional writes, then the transaction is determined to be non-ordering. In a Java™ from Sun Corporation environment, a Just In Time (JIT) compiler is often utilized to compile code just before execution. As a result, in this environment, compiler determination is dynamic, i.e. during runtime. In contrast, similar analysis is performed in a static compilation environment utilizing a compiler to statically compile program code including the transaction.

As another example, determining a transaction is non-ordering based on a read-only nature of the transaction is done during runtime based on transactional data structure status. Here, a structure, such as a write-buffer, is utilized to indicate if a transaction is a read-only type of transaction. Essentially, if the transaction is read-only, then a write-set for the transaction is empty or a write buffer holds no entries for the transaction. In these circumstances, it is capable of being determined dynamically that the transaction is read only, and consequently non-ordering, based on the write set and/or write buffer.

In one embodiment, a transaction that does not conflictingly access non-transactional data is determined to be non-ordering. Similar to the discussion above, any known method of determining if a transaction accesses non-transactional data may be utilized. As examples, detecting if a transaction accesses non-transactional data may be done through user-annotations, compiler or runtime analysis, or a combination thereof.

Accessing of non-transactional data may be determined at any granularity level. Examples of data, data elements, or references thereto, include a data object, a data reference, a field of a type of dynamic language code, a type of dynamic language code, a memory address to hold data, and a memory location to hold data. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, determining whether transactionally accessed data is conflictingly accessed non-transactionally may be performed at any of data level granularity. For example, in one embodiment, conflicting non-transactional accesses are detected at a type level. Here, a transactional write to a field A::x and a non-transactional load of field A::y may be determined to be conflictingly accessed. In another embodiment, conflict determination/analysis is performed at a field level granularity. Here, a transactional write to A::x and a non-transactional load of A::y is not determined to be conflicting, as they are references to separate fields. Note, other data structures or programming techniques may be taken into account in conflict analysis. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x is not determined to be a conflicting access in regards to a non-transactional load of field B::z of an object pointed to by A::y.

In one embodiment, user annotation in program code, whether recognizable by a compiler or hardware, identifies variables/data that are only accessed in transactions and/or transactions that only access transactional data. As a result, transactions that only include variables demarcated as transactional only data are deemed to be non-ordering.

As another example, automatic analysis of whether a transaction conflictingly accessed non-transactional data is utilized. Essentially, during compilation, whether statically or dynamically, a compiler maintains a Not Accessed Outside Transaction (NAOT) state table to track data elements and associated non-transactional access states. Therefore, data accessed within a transaction is checked against the table to determine if the transaction potentially conflictingly accesses non-transactional data. A related application filed herewith having U.S. Pat. No. 12/344,147 entitled, "Optimization for Safe Elimination of Weak Atomicity Overhead," discusses a form of automatic analysis in more detail. As a result, a version of this analysis, in one embodiment, is utilized to determine if a transaction accesses non-transactional data either statically or dynamically, i.e. whether the transaction is non-ordering statically or dynamically.

In one embodiment, write-buffering hardware transactions are determined to be non-ordering. As the example above in reference to FIG. 1 illustrates, transactional memory hardware, such as annotation bits added to cache lines, detect both transactional and non-transactional writes to cache lines, and therefore, does not allow either non-transactional or transactional reads to see the results of the transactional writes until the transaction completes its commit. Essentially, a hardware transaction operates in a similar fashion to a strong atomicity system, in that non-transactional and transactional accesses are isolated from each other, while the software overhead of a strong atomic software system is avoided due to the execution in hardware.

Here, a transaction executed in hardware may be transparent to software. However, in one example, the transaction is demarcated with instructions that are part of an Instruction Set Architecture (ISA) recognized by the hardware. As a result, the software may essentially be informed when a hardware transaction is being executed through notification by the user, i.e. use of the hardware recognized instructions.

In flows 310, depending on the determination if non-ordering transactions are present, quiescence is applied normally in flow 310 or selectively in flow 315. Here, selective application of quiescence includes any optimized version of quiescence even applied to all transactions, as well as quiescence applied to a subset of transactions. For example, in one embodiment, performing selective quiescence includes performing quiescence only for transactions to be determined ordering transactions, and inversely, not performing quiescence for non-ordering transactions.

In another embodiment, which may be performed in conjunction with quiescing for a subset of transactions, selective or optimized quiescence includes optimizing transactions that perform quiescence through removing their dependency on non-ordering transactions. Note, here quiescence may be performed on non-ordering and/or ordering transactions, i.e. they wait until preceding transactions are stable, such as done validating, done performing write updates, and/or finished committing. However, dependency of other transactions on non-ordering transactions is potentially removed, which allows the other transactions to validate/commit without regard to whether non-ordering transactions have become stable.

As an illustration, assume a first number of ordering transactions and a second number of non-ordering transactions are concurrently executing with a subsequent transaction, i.e. a transaction subsequent in sequential order to the first and second numbers of transactions. The subsequent transaction, in this example, selectively applies quiescence to ordering transactions, while eliding quiescence for non-ordering transactions. In other words, the subsequent transaction waits for validation, commit, removal from a quiescence data structure, or other quiescence removal event associated with the first number of ordering transactions before the subsequent transaction commits. However, with regard to the second number of non-ordering transactions the quiescence is elided, i.e. the subsequent transaction does not quiesce upon the second number of transactions. In other words, the subsequent transaction does not wait for a removal event, such as a commit, validation, or removal from a global data structure associated with the second number of transactions before committing. Therefore, a transaction is able to perform optimized quiescence through elision of a quiescent state for non-ordering transactions, while maintaining ordering guarantees by continuing to quiesce upon ordering transactions.

Referring next to FIG. 4, an embodiment of a flow diagram for a method of optimizing quiescence during commit in a write-buffering STM is illustrated. Although an embodiment for quiescence in a write-buffering STM is depicted, similar operations may be performed in an update-in-place STM. Furthermore, the illustrated flow is in reference to quiescence being implemented utilizing timestamps and a global timestamp list. However, the flow described herein may be easily extrapolated to any transactional system utilizing quiescence, i.e. a wait before commit of a transaction. For illustrative purposes, pseudo-code B is included below for discussion of FIG. 4.

```
     bool txnCommit (TxnDescriptor * desc) {
L1      bool nonOrdering = isNonOrderingTransaction(desc);
L2      int myTimeStamp = globalTimeStamp++; // atomic increment
L3      if (nonOrdering == false)
L4          timeStampList [desc->threadId] = desc->myTimeStamp;
L5      if (validate(desc) == false) { // will abort
L6          if (nonOrdering == false)
L7              timeStampList[desc->threadId] = 0;
L8          return false;
        }
L9      copyWriteBuffer( );
L10     if (nonOrdering == false)
L11         timeStampList[desc->threadId] = 0;
L12     releaseWriteLocks( );
L13     for (int i = 0; i < numThreads; i++) { // quiesce
L14         while (timeStampList[i] != 0 && timeStampList[i] <
                   myTimeStamp) { // C1
                   // immediately succeeds for non-ordering transactions
                      .... // spin or yield
            }
        }
L15     return true;
     }
```

Pseudo Code B: Embodiment of Pseudo Code for Optimized Quiescence

As discussed above, pseudo code may be executed as part of main program code, other code, such as a commit function in a transactional memory runtime library, or a combination thereof. In flow, 405 the timestamp for the current transaction is set/updated. Often, transactions within an STM utilize timestamps/versions to sort out transaction sequence. Usually, a global timestamp is maintained for providing universal global semantics. Therefore, upon certain events within a transaction, the transaction may update a local timestamp based on the global timestamp. Examples of these events includes start of a transaction, on-demand validation during the body of a transaction, upon commit, and upon validation during commit.

As stated above, a local version or timestamp may be utilized in an optimistic STM both for locking transaction records and comparison to validate read/write sets of a transaction. When a transaction commits, it updates the global timestamp, and as a result, other transactions through the global semantics observe that another transaction has committed through the update to the global timestamp.

As an oversimplified illustrative example, assume a global timestamp includes a value of one. A first transaction and a second transaction start; making a local copy of the global timestamp as a local timestamp of one. Either at that time, or later in the first transaction, the local timestamp is incremented to a value of two. Upon commit of the transaction, the global timestamp is updated to the later value of two. The second transaction, comparing its current timestamp of one to the global timestamp of two realizes that another transaction has committed since the second transaction started, as its local timestamp value of one is less than the global timestamp value of two.

Although not necessary to perform within the commit function, pseudo code B illustrates the setting/updating of the local timestamp (myTimeStamp) within the commit function at L2 before validation. Here, myTimeStamp is an incremented version of the global timestamp, i.e. globalTimeStamp++.

In flow 410, it is determined if the current transaction is non-ordering (L1 of pseudo code B). Here, the function isNonOrderingTransaction makes the determination and the value is stored in the Boolean variable nonOrdering, so the determination may be utilized throughout the commit function, such as in L3, L6, and L10. As mentioned in reference to FIG. 3, any known method for identifying a transaction as non-ordering, or inversely, as ordering may be utilized. As a first example, either through compilation or supporting transactional structures, a read only transaction is determined to be non-ordering. As another example, the current transaction is determined to be non-ordering in response to not conflictingly accessing non-transactional data as determined through user annotation or automatic analysis. As yet another illustrative example, a transaction may be a hardware write-buffering transaction, which does not call this commit function and essentially results in the same elision of flow 415 discussed below.

If the transaction is ordering, i.e. not non-ordering as determined in L1 of pseudo code B), then in flow 415 the transaction is added to the global quiesce list (L4 of pseudo code B). Although referred to in this example as a global list, the list may actually be any data structure, such as an array, tree with nested transactions, etc. In one embodiment, timestamp value for the transaction, i.e. myTimeSTamp, is added to an entry of the global list corresponding to the sequence of the transaction, i.e. a thread ID spot within timeStampList. However, if the transaction is non-ordering, then the transaction is not added to the global list. Here, the entry remains at a removed value, such as a zero. As a result, the non-ordering transaction does not access or modify the corresponding entry value. Later, discussion will illustrate, that this elision of adding the transaction, or a timestamp for the transaction in this example, to the list results in optimized quiescence.

In flows 420-425, the transaction is validated (L5 of pseudo code B). As an example, the transaction's structures, such as a read set, are validated. As described in relation to an optimistic STM, versions/timestamps held in transaction records may be logged in a read set in response to a read from memory addresses associated with those transaction records. During validation those logged versions are compared against the current versions to ensure no other transaction has acquired a lock on the transaction records or updated their corresponding memory addresses.

If validation fails, then in flow 440, the transaction may abort. As part of that process, if the transaction is ordering, then the transaction is removed from the global list (L6-L7 of pseudo code B), since it was added in flow 415. As an example, removal of the transaction from the global list includes updating the corresponding entry of the global list to a removal value, such as a logical zero, i.e. timeStampList[threaded]=0 (L7 of pseudo code B). Regardless of whether the transaction is ordered and removed in flow 435 or determined to be non-ordering, then in flow 440, in response to the transaction being invalid, the commit function returns false 440. Here, an abort function may be called to properly undo the transaction utilizing an undo log, such as undo log 290 from FIG. 2.

In contrast, if the transaction is determined to be valid in flow 425, then in flow 445 the buffered writes are performed, i.e. copied to memory (L9 of pseudo code B). After performing the writes, then in flow 450-455, if the transaction is ordering, then the transaction is removed from the global list. Here, the entry in the global list is set to a removed value, such as zero. Removal of the transaction from the global list, or removal of a timestamp associated with the transaction from the global list, may be referred to herein as a removal event or a quiescence removal event associated with the transaction. Whether an ordering or non-ordering transaction, then in flow 460 write locks for write operations within the transaction are released (L12 of pseudo code B).

Here, the transaction is quiescing in flow 465 and 470 (L13-15 of pseudo code B). In this example, in L13, the global list is traversed, and in L14, the while loop spin or yields while a previous transaction in the global list, i.e. timestamp[i]<myTimeStamp, has not been removed from the global list, as evidenced by a nonzero value in the corresponding entry of the global list, i.e. timeSTampList[i] !=0. Once all of the previous entries have been removed, i.e. zeroed, then from flow 470 the transaction returns true in flow 475. Note that subsequent transactions of the list, in this example, are not quiesced upon, as the current transaction is to commit before them.

Yet, the optimization of quiescence is subtle without further illustration. Therefore, assume there are four concurrent transactions executing. The first transaction calls the commit function, and it is determined that the first transaction is a read only transaction, i.e. non-ordering. As a result, upon execution of L3-L4, the first transaction is not added to the global list. Here, the first entry of the global list is not updated with the first transaction's timestamp value. Similarly, the third transaction calls the commit function and it is determined that it does not access any non-transactional data. As a result, the third entry of the global list corresponding to the third transaction is left at zero as well. However, the second transaction is determined to be ordering upon its call to the commit function and a timestamp value of the second transaction is added to the global list. Here, we assume the second transaction's timestamp value is five.

Now the example is examined from the perspective of the fourth transaction, which also calls the commit function. The fourth transaction moves through the commit function, as described above, until the quiescence at lines L13-L15. With the for loop in conjunction with the while loop, the first entry of the global list is inspected. However, since the first entry holds a zero value, i.e. a removed value, due to the first transaction being non-ordering, the statement timeStampList[1$^{st}$ entry]!=0 fails, and the for loop increments. Upon similar inspection of the second entry, the while loop yields or spins until the second transaction removes itself from the global list. Here, the second transaction is ordering, and the fourth transaction waits until a removal event associated with the second transaction is detected, i.e. the second entry is reset to the removal value of zero. Similar to the discussion of the first transaction and the corresponding first entry of the global list, the fourth transaction does not have to quiesce on the non-ordering third transaction.

Previously, without optimizing quiescence, the fourth transaction would have to wait for the first, second, and third transaction to remove from the global list, before it could commit. As a result, the thread executing the fourth transaction potentially stalls for no reason in relation to the first and third transaction, as they are non-ordering and do not affect subsequent non-transactional data accessed from other threads. Yet, after optimizing/selectively performing quiescence, the fourth transaction only waits on the second transaction to remove itself from the global list. The thread executing the fourth transaction may then immediately begin further processing. Furthermore, reads of entries corresponding to non-ordering transactions are not likely to result in a cache miss, since no other thread is modifying those entries, i.e. the entry is not likely held in an exclusive or modified state by another thread.

As stated above, the operations illustrated in this flow diagram may be modified for an update-in-place STM. For example, upon commit instead of copy buffered writes over, the logged old values replaced in the memory locations may be disregarded from a write log, instead of copied from a buffer. Furthermore, the transaction may be added to the global list at a different time, such as upon a beginning of the transaction and/or its timestamp might be updated on a successful validation.

Therefore, as can be seen from above, instead of previous systems, which utilize quiescence for every transaction, the methods and apparatus described herein provides optimized quiescence. As a result, the quiescent dependence of current transactions on previous non-ordering transactions is potentially removed, which allows for more efficient transactional execution. Furthermore, identification of non-ordering transactions may be implemented in any manner, such as during static analysis or during dynamic runtime analysis.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

What is claimed is:

1. One or more non-transitory computer-readable storage media including program code which, when executed by a machine, causes the machine to perform the operations of:
   determining, by executing compiler code prior to beginning execution of a first transaction, the first transaction comprises an ordering transaction that includes a potentially conflicting access to non-transactional data, wherein the first transaction comprises a transactional memory transaction that includes a grouping of code to be executed as a group, wherein the non-transactional data comprises data accessed by code executed outside of any transactional memory transaction, and wherein the potentially conflicting access to the non-transactional data is observable by a non-transactional memory access performed by code executed outside of any transactional memory transaction;
   determining, by executing the compiler code prior to beginning execution of a second transaction, the second transaction includes a non-ordering transaction that does not access non-transactional data or non-conflictingly accesses non-transactional data, wherein the second transaction comprises a transactional memory transaction that includes a grouping of code to be executed as a group, and wherein the non-transactional data comprises data accessed by code executed outside of any transactional memory transaction;
   beginning execution of the first transaction and the second transaction; and
   committing a third transaction, wherein the third transaction comprises a transactional memory transaction that includes a grouping of code to be executed as a group, and wherein the third transaction is subsequent in a sequential order to the first transaction and the second transaction, and wherein committing the third transaction comprises:
   performing quiescence of the third transaction upon the first transaction in response to determining the first transaction includes an ordering transaction, wherein the third transaction does not include a data conflict with the first transaction, and wherein performing quiescence of the third transaction upon the first transaction comprises waiting for the first transaction to stabilize; and
   eliding quiescence of the third transaction upon the second transaction in response to determining the second transaction includes a non-ordering transaction.

2. The computer-readable media of claim 1, wherein performing quiescence of the third transaction upon the first transaction comprises waiting to commit the third transaction until a removal event associated with the first transaction is detected.

3. The computer-readable media of claim 2, wherein a removal event associated with the first transaction is selected from a group consisting of validating the first transaction, committing the first transaction, aborting the first transaction, performing buffered writes associated with the first transaction, and removing the first transaction from a global quiescence list.

4. The computer-readable media of claim 2, wherein detecting a removal event associated with the first transaction includes:
   checking a data structure holding an entry corresponding to the first transaction; and
   detecting a removal event in response to the entry holding a removal value.

5. The computer-readable media of claim 1, wherein determining the first transaction includes an ordering transaction comprises determining the first transaction is not a non-ordering transaction.

6. The computer-readable media of claim 1, wherein determining the second transaction includes a non-ordering transaction includes determining the second transaction includes a read-only transaction.

7. The computer-readable media of claim 6, wherein determining the second transaction includes a read-only transaction comprises executing code prior to executing the second transaction, wherein the code is selected from a group consisting of a static compiler code, when executed, to statically determine if the second transaction is a read only transaction, and a dynamic compiler code, when executed, to dynamically determine if the second transaction is a read only transaction.

8. The computer-readable media of claim 1, wherein determining the second transaction includes a non-ordering transaction includes determining the second transaction includes a transaction that does not access non-transactional data.

9. The computer-readable media of claim 8, wherein determining the second transaction includes a transaction that does not access non-transactional data is based on user-annotations associated with data accessed within the transaction.

10. The computer-readable media of claim 8, wherein determining the second transaction includes a transaction that does not access non-transactional data comprises executing compiler code to perform automatic analysis to determine the second transaction does not conflictingly access non-transactional data.

11. The computer-readable media of claim 1, wherein the program code includes a commit function in a transactional runtime library to be executed for the first transaction, the second transaction, and the third transaction.

12. One or more non-transitory computer-readable storage media including program code which, when executed by a machine, causes the machine to perform the operations of:
committing a current transaction without quiescence based on a previous transaction in response to determining, by executing compiler code prior to executing the previous transaction, the previous transaction includes a non-ordering transaction that does not access non-transactional data or non-conflictingly accesses non-transactional data, wherein the non-transactional data comprises data accessed by code executed outside of any transactional memory transaction; and
committing the current transaction after quiescence based on the previous transaction in response to determining, by executing the compiler code prior to executing the previous transaction, the previous transaction includes an ordering transaction that includes a potentially conflicting access to non-transactional data, wherein the non-transactional data comprises data accessed by code executed outside of any transactional memory transaction, and wherein the potentially conflicting access to the non-transactional data is observable by a non-transactional memory access performed by code executed outside of any transactional memory transaction, and wherein the current transaction does not include a data conflict with the previous transaction.

13. The computer-readable media of claim 12, wherein determining the previous transaction includes a non-ordering transaction comprises: determining the previous transaction includes a transaction type selected from a group consisting of a read only transaction type and a does not conflictingly access non-transactional data type.

14. The computer-readable media of claim 13, wherein determining the previous transaction includes an ordering transaction comprises: determining the previous transaction does not include a transaction type selected from a group consisting of a read only transaction type and a does not conflictingly access non-transactional data type.

15. The computer-readable media of claim 12, wherein committing a current transaction without quiescence based on a previous transaction comprises committing the current transaction without waiting for an event associated with the previous transaction.

16. The computer-readable media of claim 12, wherein committing the current transaction after quiescence based on the previous transaction comprises waiting for an event associated with the previous transaction before committing the current transaction.

17. The computer-readable media of claim 16, wherein the event associated with the previous transaction comprises removal of the previous transaction from a global data structure in response to a removal event.

18. The computer-readable media of claim 17, wherein removal of the previous transaction from the global data structure comprises updating an entry of the global data structure corresponding to the previous transaction to a removal value.

19. The computer-readable media of claim 18, wherein the global data structure includes a global list of timestamp values, and wherein the removal event is selected from a group consisting of committing the previous transaction, validating the previous transaction, aborting the previous transaction, and performing buffered writes associated with the previous transaction.

20. One or more non-transitory computer-readable storage media including program code which, when executed by a machine, causes the machine to perform the operations of:
determining, by executing compiler code prior to executing a first transaction, if the first transaction is a non-ordering transaction that does not access non-transactional data or non-conflictingly accesses non-transactional data, wherein the first transaction comprises a transactional memory transaction, wherein the non-transactional data comprises data accessed by code executed outside of any transactional memory transaction, and wherein the non-ordering transaction does not include a potentially conflicting access to the non-transactional data that is observable by a non-transactional memory access performed by code executed outside of any transactional memory transaction;
eliding addition of the first transaction to a global data structure in response to determining the first transaction is a non-ordering transaction;
in response to determining the first transaction is not a non-ordering transaction,
adding the first transaction to the global data structure, and
removing the first transaction from the global structure in response to a removal event associated with the first transaction;
committing a second transaction without quiescence based on the first transaction in response to not adding the first transaction to the global data structure, wherein the second transaction comprises a transactional memory transaction; and
performing quiescence of the second transaction until removing the first transaction from the global data structure further in response to adding the first transaction to the global structure, wherein the second transaction does not include a data conflict with the first transaction, and wherein performing quiescence of the second transaction comprises waiting to commit the second transaction until removing the first transaction from the global data structure;
wherein the second transaction is subsequent in a sequential order to the first transaction.

21. The computer-readable media of claim 20, wherein the global data structure comprises a global list of entries including a first entry corresponding to the first transaction and a second entry corresponding to the second transaction.

22. The computer-readable media of claim 21, wherein adding the first transaction to the global list includes updating the first entry corresponding to the first transaction to a first timestamp value associated with the first transaction, and wherein removing the first transaction from the global list includes updating the first entry corresponding to the first transaction to a removed value.

23. The computer-readable media of claim 22, wherein eliding addition of the first transaction to the global list in response to determining the first transaction is a non-ordering transaction comprises not executing an add operation to update the first entry corresponding to the first transaction to the first timestamp value in response to executing a conditional statement operation to jump the add operation in response to determining the first transaction is a non-ordering transaction.

24. A machine-executable method comprising:
determining, by executing compiler code prior to executing a first transaction, the first transaction is an ordering transaction that includes a potentially conflicting access to non-transactional data, wherein the non-transactional data comprises data accessed by code executed outside of any transactional memory transaction, and wherein the potentially conflicting access to the non-transactional data is observable by a non-transactional memory access performed by code executed outside of any transactional memory transaction;

determining, by executing the compiler code prior to executing a second transaction, the second transaction is a non-ordering transaction that does not access non-transactional data or non-conflictingly accesses non-transactional data, wherein the non-transactional data comprises data accessed by code executed outside of any transactional memory transaction;

quiescing a third transaction until a quiescent removal event associated with the first transaction is detected in response to determining the first transaction is an ordering transaction, wherein the third transaction does not include a data conflict with the first transaction, wherein quiescing the third transaction comprises waiting to commit the third transaction until the quiescent removal event associated with the first transaction is detected; and committing the third transaction without quiescing the third transaction based on the second transaction in response to determining the second transaction is non-ordering;

wherein the third transaction is subsequent in a sequential order to the first transaction and the second transaction.

25. The method of claim 24, wherein determining the second transaction includes a non-ordering transaction comprises: determining the second transaction includes a transaction type selected from a group consisting of a read only transaction type and a does not conflictingly access non-transactional data type, and wherein determining the first transaction includes an ordering transaction comprises: determining the first transaction does not include a transaction type selected from a group consisting of a read only transaction type and a does not conflictingly access non-transactional data type.

26. The method of claim 24, wherein a quiescent removal event associated with the first transaction is selected from a group consisting of validating the first transaction, committing the first transaction, aborting the first transaction, performing buffered writes associated with the first transaction, and removing the first transaction from a global quiescence list.

27. The method of claim 24, wherein quiescing a third transaction until a quiescent removal event associated with the first transaction is detected comprises waiting to commit the third transaction until the quiescent removal event is detected.

28. The method of claim 26, wherein committing the third transaction without quiescing the third transaction based on the second transaction comprises committing the third transaction without regard to removal events associated with the second transaction.

* * * * *